US010423237B2

(12) United States Patent
Episkopos et al.

(10) Patent No.: US 10,423,237 B2
(45) Date of Patent: Sep. 24, 2019

(54) GESTURE-BASED CONTROL AND USAGE OF VIDEO RELAY SERVICE COMMUNICATIONS

(71) Applicant: Purple Communications, Inc., Rocklin, CA (US)

(72) Inventors: Dennis Episkopos, Westminster, CO (US); Cliff Pearce, Rocklin, CA (US); Francis Kurupacheril, Cupertino, CA (US)

(73) Assignee: Purple Communications, Inc., Rocklin, CA (US)

( * ) Notice: Subject to any disclaimer, the term of this patent is extended or adjusted under 35 U.S.C. 154(b) by 0 days.

(21) Appl. No.: 15/676,078

(22) Filed: Aug. 14, 2017

(65) Prior Publication Data

US 2018/0048859 A1    Feb. 15, 2018

Related U.S. Application Data

(60) Provisional application No. 62/375,243, filed on Aug. 15, 2016.

(51) Int. Cl.
| | |
|---|---|
| *G06F 3/01* | (2006.01) |
| *H04N 7/14* | (2006.01) |
| *G09B 21/00* | (2006.01) |
| *G06K 9/00* | (2006.01) |
| *G06F 3/0482* | (2013.01) |
| *G06F 3/0488* | (2013.01) |
| *H04N 7/15* | (2006.01) |
| *G06K 9/78* | (2006.01) |
| *H04M 1/725* | (2006.01) |

(52) U.S. Cl.
CPC ............ *G06F 3/017* (2013.01); *G06F 3/0482* (2013.01); *G06F 3/04886* (2013.01); *G06K 9/00355* (2013.01); *G09B 21/009* (2013.01); *H04N 7/142* (2013.01); *H04N 7/147* (2013.01); *H04N 7/15* (2013.01); *G06K 9/78* (2013.01); *H04M 1/72583* (2013.01)

(58) Field of Classification Search
USPC ........................................................ 348/14.03
See application file for complete search history.

(56) References Cited

U.S. PATENT DOCUMENTS

| | | |
|---|---|---|
| 7,349,955 B1 | 3/2008 | Korb et al. |
| 8,010,706 B1 | 8/2011 | Rein et al. |
| 8,528,068 B1 | 9/2013 | Weglein et al. |
| 9,628,620 B1 | 4/2017 | Rae et al. |

(Continued)

*Primary Examiner* — Amal S Zenati
(74) *Attorney, Agent, or Firm* — Scheinberg & Associates, PC

(57) ABSTRACT

A method and system are disclosed for enabling members of the deaf, hard of hearing, or speech-impaired (D-HOH-SI) community to start and control communications conducted through a video relay service (VRS) without the need for a remote-control device. A combination of standard-ASL and non-ASL hand commands are interpreted using "hand recognition" (similar to "face recognition") to control the operation of a VRS system through multiple operating modes. The "hand recognition" process employs a camera/codec connected to a CPU which executes commands which may be stored in a non-volatile computer-readable storage device.

16 Claims, 5 Drawing Sheets

(56) References Cited

U.S. PATENT DOCUMENTS

| | | | |
|---|---|---|---|
| 2002/0057383 A1* | 5/2002 | Iwamura | G08C 23/00 348/734 |
| 2010/0142683 A1* | 6/2010 | Goldman | G06K 9/00355 379/52 |
| 2015/0022616 A1 | 1/2015 | Talbot | |
| 2015/0125829 A1* | 5/2015 | Hyman | B44C 3/046 434/81 |
| 2018/0013886 A1 | 1/2018 | Rae et al. | |

* cited by examiner

GESTURE-BASED CONTROL AND USAGE OF VIDEO RELAY SERVICE COMMUNICATIONS

TECHNICAL FIELD OF THE INVENTION

The present invention enables members of the deaf, hard of hearing, or speech-impaired (D-HOH-SI) community to start and control communications conducted through a video relay service (VRS) without the need for a remote-control device.

BACKGROUND OF THE INVENTION

For persons in the D-HOH-SI community, standard audio phone conversations may be difficult or impossible. The D-HOH-SI community typically relies instead on a video relay service (VRS) for phone communications. VRS is a video telecommunication service that allows D-HOH-SI individuals to communicate over video telephones and similar technologies with hearing people in real-time, via a sign language interpreter (SLI), wherein both the user and the SLI sit in front of VRS clients connected to the internet. Embodiments of the present invention may operate with VRS or other types of visual phone communications systems and methods employed by D-HOH-SI individuals to facilitate communications between two or more D-HOH-SI individuals, and between D-HOH-SI individuals and with hearing individuals (using SLIs).

Recent technical advances have led to the growth in the use of VRS by D-HOH-SI persons. Using VRS equipment, D-HOH-SI persons can place video calls to communicate between themselves and with other individuals (either hearing or D-HOH-SI) using sign language. VRS equipment enables D-HOH-SI persons to talk to hearing individuals via an SLI, who uses a conventional telephone at the same time to communicate with the party or parties with whom the D-HOH-SI person wants to communicate.

FIG. 1 is an example 100 of a commercially-available remote control device, showing front 102 and back 104 sides. The front side 102 comprises various buttons for dictating specific commands to a system which enables communication with other users and interpreters, while the backside 104 comprises a QWERTY keyboard with small keys (the keys are necessarily small to minimize the overall dimensions of the remote control). Use of these remote controls may be cumbersome for a number of reasons:

1) The remote control is small and may easily be misplaced or lost, rendering the entire VRS system unusable. In emergency situations, requiring an immediate "911" call on the VRS system, misplacement of the remote control could have serious safety and/or health implications.
2) Multiple steps are required to make a call using a remote control,
3) Typing of QWERTY letters on the small backside keypad (see view 104 in FIG. 1) can be a nuisance and cause numerous spelling errors requiring backing up and correction, thus making the typing process slow,
4) Only a specific pre-programmed set of commands can be executed by the remote (based on the hardware keys)—there is no way to add new commands,
5) Either batteries or a wired power source are required.

It would be advantageous to provide a method for controlling and using a VRS system that would avoid these difficulties encountered with the use of a separate remote control for VRS communications. This may include VRS calls to other D-HOH-SI individuals or hearing individuals who know ASL (where both parties to the call utilize ASL) as well as calls to hearing individuals who do not know ASL (where in intermediate SLI is utilized).

It would be an additional advantage to configure a VRS client to execute this method for controlling and using a VRS system without the need for a separate remote control.

It would be a further advantage to be able to initiate and control VRS calls by selection of various menu items without the need for a remote control.

SUMMARY OF THE INVENTION

Embodiments of the present invention are directed to a method and system for enabling a D-HOH-SI individual to initiate and control a VRS call to another individual (either hearing or D-HOH-SI also) without the need for a separate remote control device.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF EMBODIMENTS

Figure 1:
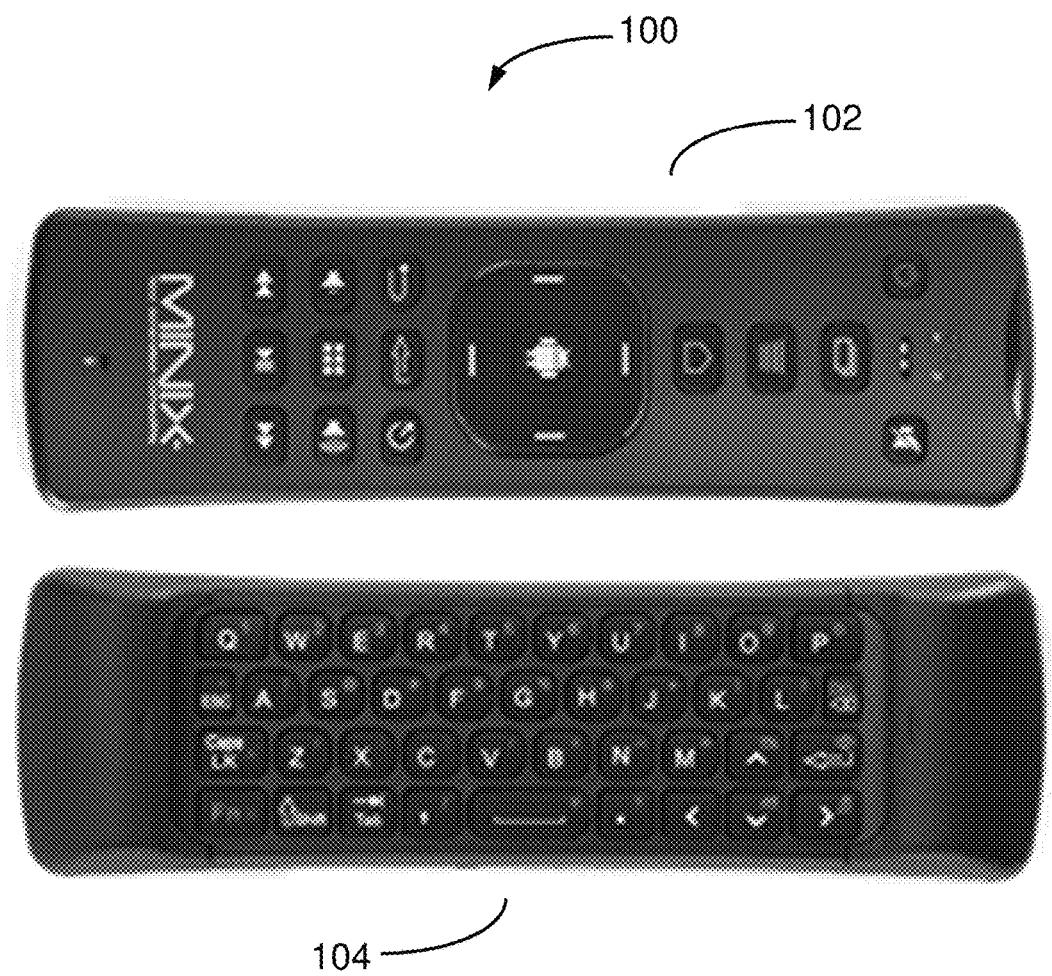
FIG. 1 is an example of a remote-control device, showing front and back sides.

Embodiments of the present invention are directed to a method and system for enabling members of the D-HOH-SI community to initiate and control video VRS calls or video conferences without the need for a separate remote control device (e.g., see FIG. 1).

Hardware and Software Entities

Figure 2:
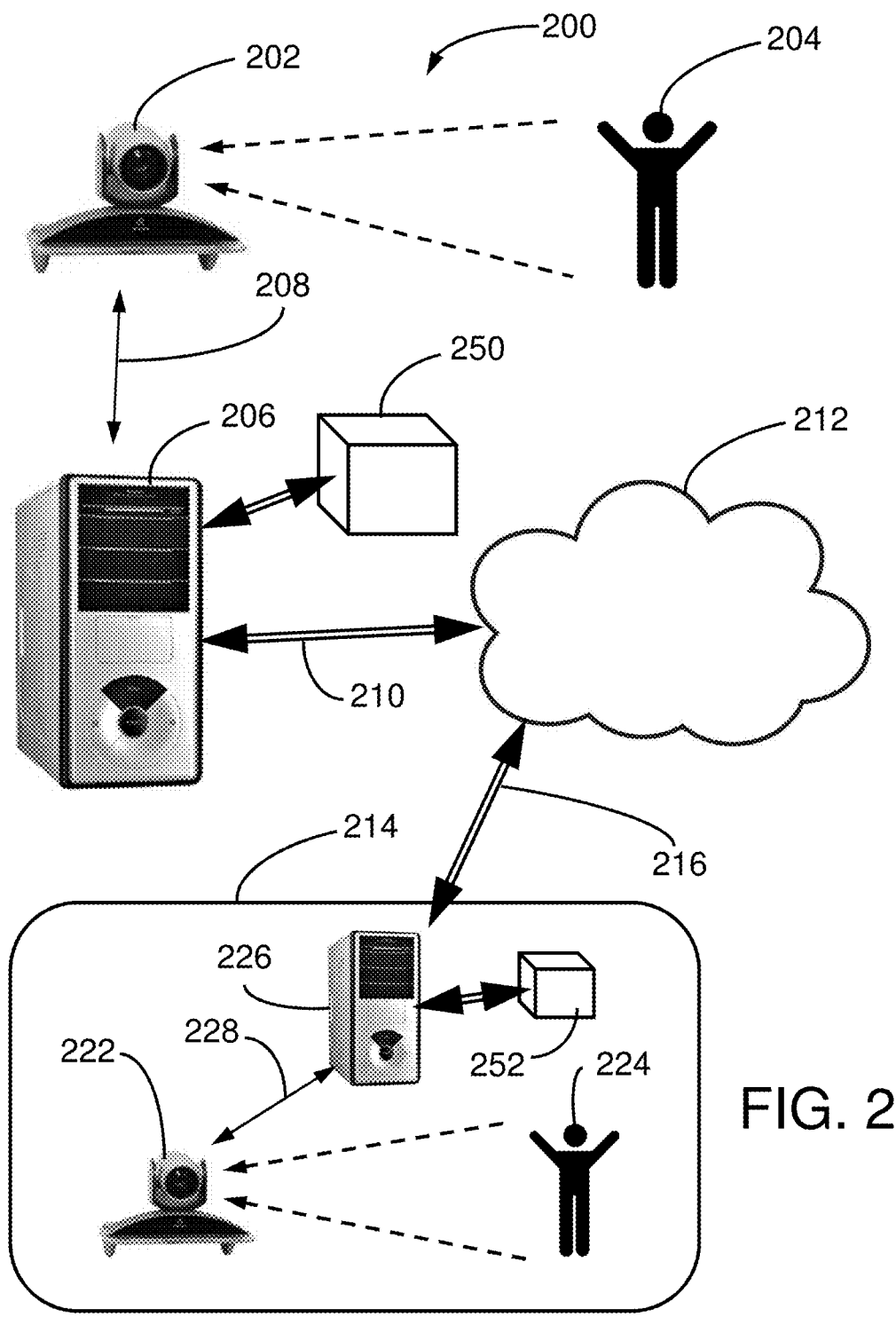
FIG. 2 shows the hardware and software entities of the invention and their interactions.

FIG. 2 shows the hardware and software entities 200 of the invention and their interactions and interconnections. A user 204 sits or stands in front of the camera which is part of a combined camera and codec module 202. Embodiments with a separate camera and codec also fall within the scope of the invention. The camera/codec module 202 communicates 208 either by wire, or wireles sly, with a computer processing unit (CPU) 206 which may be configured to execute commands stored in a non-volatile computer-readable storage device 250 (e.g., a hard disk drive, removable disk drive, flash memory device, etc.). CPU 206 may be implemented as a desk-top computer, a laptop computer, a tablet computer, a smartphone, or a dedicated processing and computing system (e.g., a terminal on a time-sharing computer system). All of these implementations of CPU 206 fall within the scope of the invention. In some embodiments, camera and codec 202 may be integrated with CPU 206 into a single hardware module.

CPU 206 communicates with the cloud 212 through link 210, which may be a wired or wireless link using a standard internet protocol (IP). One example may be the Session Initiation Protocol (SIP), which is a communications protocol for signaling and controlling multimedia communication sessions in applications of Internet telephony for voice and video calls. An Automatic Call Distributor (ACD) may be employed to route calls between the initiating caller (user 204) and a remote receiver 224 of the call.

Remote receiver 224 has a similar arrangement 214 of camera and codec 222 (wherein the remote receiver 224 sits or stands in front of the camera) and CPU 226 communicating either wirelessly or through a wired connection 228. CPU 226 may be configured to execute commands stored in a non-volatile computer-readable storage device 252. The above considerations for various hardware considerations for the camera, codec 202, CPU 206 and storage device 250 fall within the scope of the invention for the camera, codec 222, CPU 226 and storage device 252 of the remote receiver as well.

Figure 4:
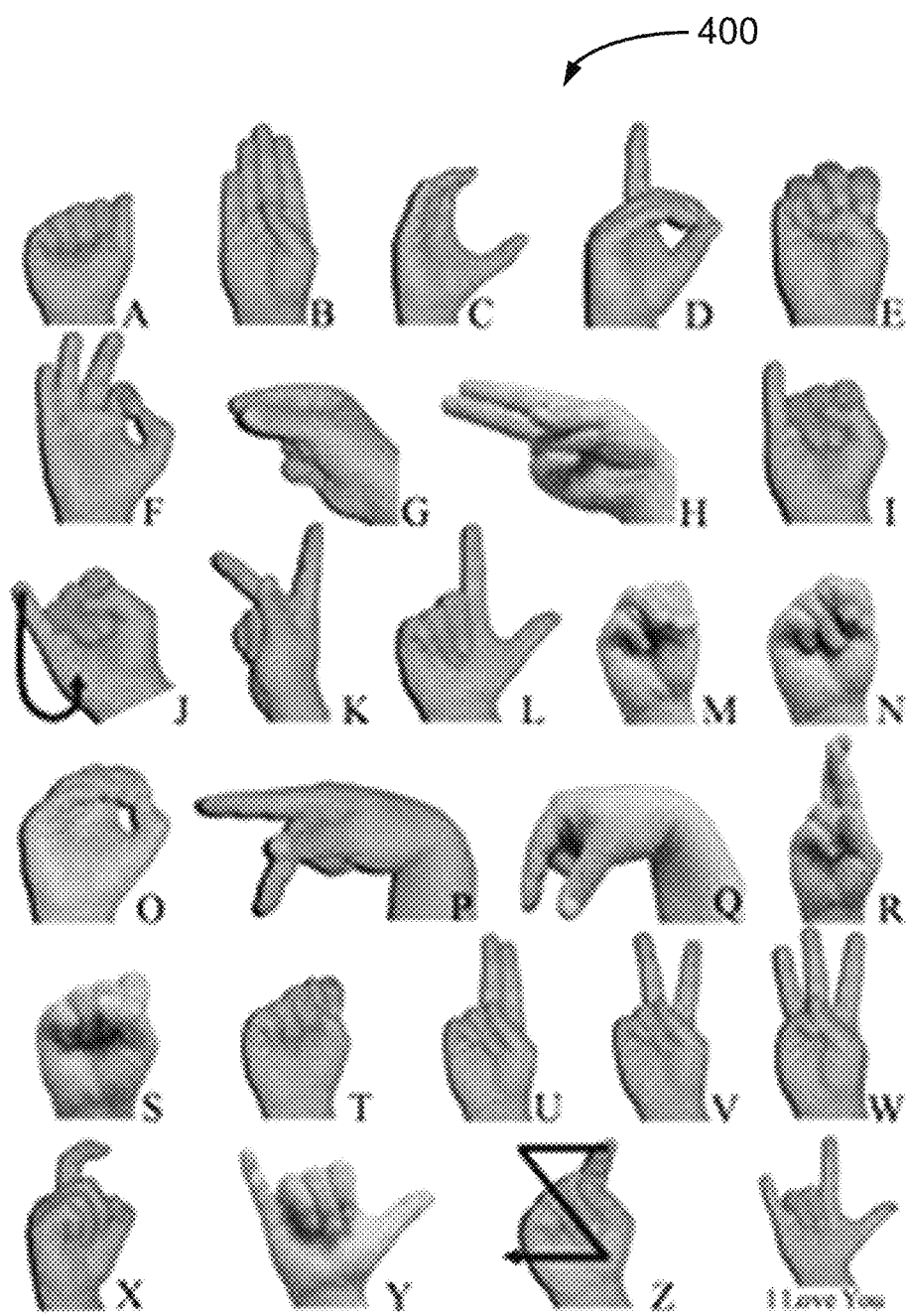
FIG. 4 shows ASL alphabetic signs for use in QWERTY Mode.

Image processing functions executed by CPU 206 according to commands executed by it (stored in embodiments in a non-volatile computer-readable storage medium 250) concentrate on the hands of user 204 (not the face)—this aspect of the invention may be thought of as a form of "hand recognition" (as opposed to the more-common "face recognition"). "Hand Recognition" is an image processing operation which "observes" the positions and motions of the user's fingers and hands in a continual process from the real-time video images acquired by the camera/codec 202 and transmitted to CPU 206 through link 208. Recognition of hand commands comprises both momentary positions of the fingers and hands, as well as the integrated directions of motion (determined from a succession of video images). Thus, for example, hand recognition of the ASL sign for the letter "Z" would comprise both a determination of the configuration of the fingers and palm, as well as motion-tracking of the entire hand as it travels in a "Z" pattern (see bottom of FIG. 4). Other hand commands may only comprise a momentary configuration of fingers and hands, with no determination of motion required. First steps in hand recognition may comprise various standard image processing techniques such as gray-scale modification, brightness and contrast adjustment, or other functions such as edge-enhancement—the purpose of these steps may be to improve recognition of image features such as fingers, palms, and hands, thereby improving the reliability and accuracy of the hand recognition process.

In some circumstances, there may be multiple users 204 who are collectively participating in the VRS call and may be nearly simultaneously employing ASL within view of the camera/codec 202. In these situations, embodiments may employ one or more microphones (either within camera/codec 202, within CPU 206, or as stand-alone devices) to detect "hand-originated sounds" and thereby to determine which user is communicating by ASL at any one time. After this determination of the active user, the various hand-originated control signals of the invention may be determined from only that user until another user becomes active.

Within embodiments, users may configure the unit to receive and translate their commands, or sequences of commands, into specific actions to be performed by the CPU or VRS system. Commands may be stored in non-volatile computer-readable storage devices such as hard disk drives, removable disk drives, flash memories, etc.

Device Operating Modes and Process Flow Between Them

Figure 3:
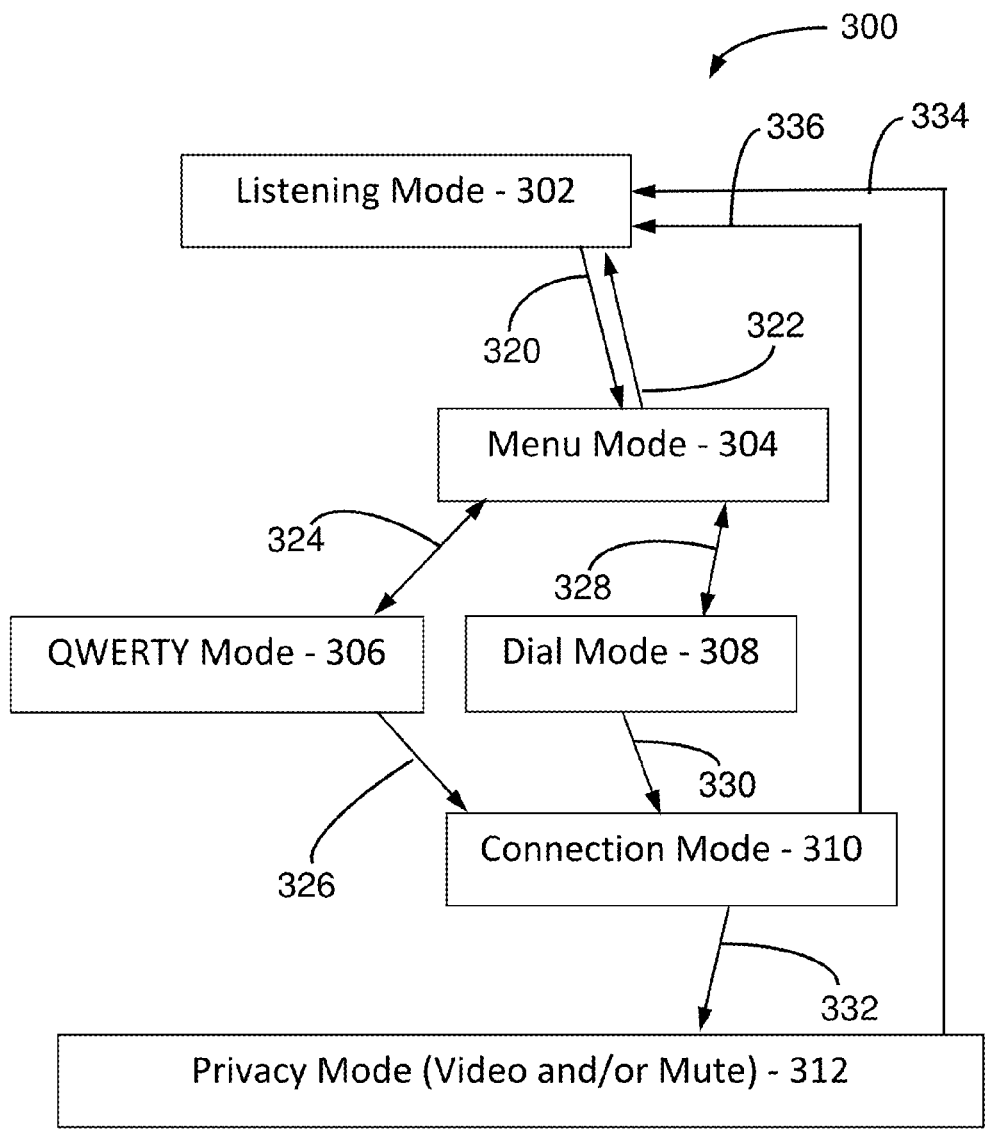
FIG. 3 shows six operating modes of the invention and the flow between them.

FIG. 3 shows six operating modes 300 of embodiments of the invention. Each of these operating modes is described more fully in the following sections, along with the process flows between these modes during the process of initiating and controlling VRS communication.

Listening Mode—302: This is essentially the "idling" mode, which is the state of the system when no call is in progress—the system is "observing" the user, "looking" (using "hand recognition") for hand commands to "kick off" a VRS call.

Menu Mode—304: This mode is entered from Listening Mode 302 once the user gives a (typically non-ASL) hand-command. The system then waits for further hand-commands to be entered by the user from a menu listing possible actions.

QWERTY Mode—306: Entered from Menu Mode 304, here the device is ready receive commands which are entered as strings of one or more letters using the standard ASL alphabet.

Dial Mode—308: Entered from Menu Mode 304, here the device is ready to receive commands which are entered as strings of one or more numbers (digits) using the standard ASL number signs.

Connection Mode—310: This mode corresponds to the process of conducting a phone conversation. Multiple modes (audio, video, or any combination) are possible, as selected in either QWERTY Mode 306 or Dial Mode 308.

Privacy Mode—312: This mode puts the system "offline" from the perspective of other potential callers, wherein the user 204 does not wish to communicate with any other user 224. This mode also enables "video transmit black" mode wherein only audio transmission is enabled.

Listening Mode 302

In this operating mode, the system is "idling" and no VRS call is underway—during this period, the system is repeatedly imaging the user (or that region in front of camera/codec 202 where a user would be located during use of the VRS system). While imaging, the CPU 206 is constantly executing "hand recognition" commands—waiting to "observe" new hand commands from a user 204.

The non-ASL hand-command to initiate a call (i.e., go to Menu Mode 304) using the VRS system may be a repeated action (e.g., hand moving side-to-side, or up-and-down) with a small delay between actions to avoid false positives arising from normal hand motions which are not intended as hand commands to the VRS system. Once a hand command is recognized by CPU 206 (from signals sent over link 208 and possibly executing commands stored in a non-volatile computer-readable storage unit 250), then Menu Mode 304 is entered through arrow 320. This event of recognizing a user hand-command may be viewed as a user "kicking off", or initiating a VRS call.

Listening Mode 302 may be re-entered from Connection Mode 310 (arrow 336), Privacy Mode 312 (arrow 334), or Menu Mode (arrow 322).

Menu Mode 304—Exemplary Menu Selections

Menu Mode 304 is the most complicated of the six operating modes. Details of the selectable items in the menu may vary for embodiments of the invention and/or for individual users (even when using the same VRS station), however exemplary items may comprise:

Contacts: A list of all contacts which have been added to the data storage in CPU 206. If there is more than one user of a single VRS station, sub-menus for individual users may be enabled, with user-dependent access if desired (i.e., each user would have access only to their own contact list, as well as to a common contact list for all users).

History: A list of all connections contacted from this VRS station in chronological order, back to a date at which the history was last erased, or the system was initially configured.

PurpleMall: Brings up the PurpleMall interface.

Search: A search engine for contacts, Yelp, PurpleMall, etc.

Apps: Open various applications which have previously been downloaded into the local VRS station.

Other: Other types of menu entries are possible within the scope of the invention.

Menu Mode 304—Exemplary Hand Commands

Selection of menu entries, such as those listed above, may employ non-ASL hand commands, such as the following examples (other hand commands not listed here fall within the scope of the invention, and alternative hand commands for the following actions also fall within the scope of the invention):

Bring up QWERTY Mode (arrow 324): Exemplary hand command: repeated action with a small inter-action delay (to avoid false positives).

Bring up Dial Mode (arrow 328): Exemplary hand command: repeated action with a medium inter-action delay (to avoid false positives). The longer inter-action delay differentiates this hand command from the command to bring up QWERTY Mode.

Move the pointer focus to a different menu item: Exemplary hand command: a thumb sign (could be an ASL command). No delays are required for this command and the direction of thumb pointing and motion indicates the desired direction for pointer motion (i.e., up, down, left, or right) on the screen. Motion distinguishes the left pointing and moving command from the merely left pointing command below for returning to a previous screen or menu item.

Select menu item: Exemplary hand command: user points with their finger (moving forward towards the screen and camera) to select a menu item—no delays are required.

Return to the previous screen or menu item: Exemplary hand command: thumb pointing to the left (with no motion)—no delays are required; however, this command must be differentiated from the left-pointing thumb command used (see above) to move the pointer to the left to select a different menu item. No delays are required for this hand command.

Change camera focus: Exemplary hand command: thumb action either towards the user or away from the user. Motion of the thumb towards the user indicates that the focus should move farther away from the camera/codec 202, while motion of the thumb away from the user indicates that the focus should move closer to the camera/codec 202. No delays are required for this hand command.

Call, answer, or hang-up: Exemplary hand command: gestures representing call, answer, and hang up. The ASL gesture for "call" is a hand near the face with little finger and thumb protruding (to look like a phone receiver) with a short motion away from the face. The ASL gesture for "answer" is both hands with forefingers extended at the upper chest with a quick movement out and down. The ASL gesture for "hang up" is to mimic replacing a receiver back in its cradle. Embodiments may use these standard ASL commands, or other non-ASL gestures may be used either in addition or instead.

Depending on the selection made from the menu, Menu Mode 304 may exit back to Listening Mode 302 (arrow 322), QWERTY Mode 306 (arrow 324) or Dial Mode 308 (arrow 328).

QWERTY Mode 306

QWERTY Mode 306 is entered from Menu Mode 304, here the device is ready to receive commands which are entered as strings of one or more letters. Embodiments may use the standard ASL alphabet 400 illustrated in FIG. 4, or an alternative alphabetic signing method, or a combination of standard-ASL and non-ASL alphabetic signing. When a user issues a QWERTY letter command, the on-screen menu may be "depressed" (i.e., displayed with side shadowing giving an appearance that the menu is recessed behind the front surface of the screen). Once a QWERTY Mode command has been recognized by CPU 206 (from signals sent over link 208), then either Menu Mode 304 is entered (arrow 324) or Connection Mode 310 is entered (arrow 326).

Dial Mode 308

Figure 5:
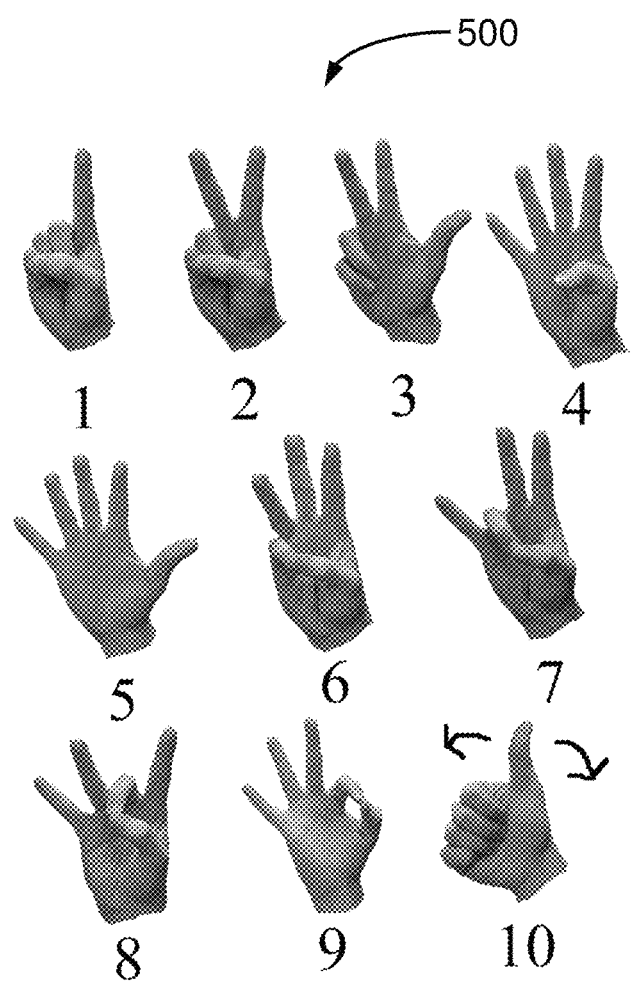
FIG. 5 shows ASL numeric signs for use in Dial Mode.

Dial Mode 308 is entered from Menu Mode 304, here the device is ready to receive commands which are entered as strings of one or more numbers. Embodiments may use the standard ASL number signs 500 illustrated in FIG. 5, or an alternative numeric signing method, or a combination of standard-ASL and non-ASL numeric signing. When a user issues a numeric command, the on-screen menu may be "depressed" (i.e., displayed with side shadowing giving an appearance that the menu is recessed behind the front surface of the screen). Once a Dial Mode command has been recognized by CPU 206 (from signals sent over link 208), then either Menu Mode 304 is entered (arrow 328) or Connection Mode 310 is entered (arrow 330).

Connection Mode 310

This mode corresponds to the process of conducting a phone conversation. Multiple modes are possible, as selected based on commands entered in either QWERTY Mode 306 or Dial Mode 308. Hand commands for Connection Mode may typically be non-ASL commands:

Hang up connection: Exemplary hand command: repeated action with a small inter-action delay (to avoid false positives).

Toggle video on/off: Exemplary hand command: snap action one time to toggle the video on or off in the Privacy Mode 312. Following this command, the connection is terminated and Privacy Mode 312 is entered.

Toggle audio on/off (unmute/mute): Exemplary hand command: snap action twice (with a small inter-action delay) to toggle the sound on or off in the Privacy Mode 312. Following this command, the connection is terminated and Privacy Mode 312 is entered.

If the connection is hung up, then Listening Mode is re-entered (arrow 336), otherwise Privacy Mode 312 is entered (arrow 332).

Privacy Mode 312

This mode puts the system "off-line" from the perspective of other potential callers, wherein the user 204 does not wish to communicate with any other user 224. In Privacy Mode 312, the video and/or audio may be toggled on/off with the following hand commands:

Turn on/off video in Privacy Mode: Exemplary hand command: snap action one time to toggle the video on or off in the Privacy Mode 312. Following this command, the connection is terminated and Privacy Mode 312 is entered.

Mute/unmute (toggling) in Privacy Mode: Exemplary hand command: snap action twice (with a small inter-action delay) to toggle the sound on or off in the Privacy Mode 312. Following this command, the connection is terminated and Privacy Mode 312 is entered.

Return to Listening Mode: Exemplary hand command: snap action three-times (with small inter-action delays) to exit Privacy Mode 312 and re-enter (arrow 334) Listening Mode 302.

Use of Remote Controls and Sound-Based Commands

Although embodiments have disclosed the control and operation of a VRS system which does not require the use of a separate remote control, continued use of a remote control (in many cases already owned by a D-HOH-SI user of the VRS system) is not precluded by use of embodiments of the invention.

Embodiments of the invention do not utilize any sound-based commands, and instead rely on hand gestures which are "observed" and interpreted by a CPU 206 executing commands for "hand recognition" which may be stored in a non-volatile computer-readable storage medium 250 connected to CPU 206, or contained within CPU 206.

Accidental or Erroneous Gesture Detection

In embodiments, internal double-checks may be implemented to prevent accidental or erroneous gesture detection. "Accidental" gesture detection may represent the "hand recognition" method interpreting motions of the user to be hand commands which, in reality, were not intended as any command at all—although not all accidental gestures may be detectable, at least some may be incomplete or illogical in view of the current system status (e.g., interpreting menu selection commands while the system is not in connection mode). "Erroneous" gesture detection may represent an incorrect interpretation of a hand gesture which was intended to activate a different operation of the VRS system. To avoid deleterious operations in both these cases, embodiments may display an error message on the VRS screen and prevent execution of the accidental or erroneous command.

The following are additional enumerated embodiments according to the present disclosure.

A first embodiment, which is a method for enabling a user to start and control communications conducted through a video relay service (VRS) without the need for a remote-control device, the method comprising configuring a VRS client, including a camera; a computer processing unit; and an internet connection; loading video images of the user acquired with the camera into the computer processing unit; recognizing hand commands using the computer processing unit, wherein the computer processing unit executes computer commands to perform a hand recognition operation; and performing control functions of the video relay service based on the recognized hand commands.

A second embodiment, which is the method of the first embodiment, further comprising a non-volatile computer-readable storage medium connected to the computer processing unit, wherein hand recognition computer commands are stored in the non-volatile computer-readable storage medium.

A third embodiment, which is the method of the first embodiment, further comprising repeating the steps of loading video images, recognizing hand commands, and performing control functions to perform multiple operations during VRS communications.

A fourth embodiment, which is the method of the first embodiment, wherein the hand recognition operation comprises the steps of storing one or more video images in the computer processing unit; performing image processing operations on the stored video images; performing hand recognition operations on the processed video images, thereby developing a computer model of the hand position, finger positions, and directions of finger and hand motions; and comparing the computer model of the hand position, finger positions, and directions of finger and hand motions with pre-determined hand commands.

A fifth embodiment, which is the method of the fourth embodiment, wherein the image processing operations comprise gray-scale modification, brightness and contrast adjustment, and/or edge-enhancement functions.

A sixth embodiment, which is the method of the fourth embodiment, wherein the hand recognition operations comprise the steps of analyzing the processed video images to determine the positions of various locations on each of the fingers of the user, and the overall position of the hand of the user; and comparing successive processed video images to determine the directions of motion of various locations on each of the fingers of the user, and the overall motion of the hand of the user.

A seventh embodiment, which is a system for enabling a user to start and control communications conducted through a video relay service without the need for a remote-control device, the system comprising a camera; a computer processing unit, wherein the computer processing unit is configured to execute hand recognition operations; and an internet connection.

An eighth embodiment, which is the system of the seventh embodiment, further comprising a non-volatile computer-readable storage medium connected to the computer processing unit, wherein hand recognition computer commands are stored in the non-volatile computer-readable storage medium.

A ninth embodiment, which is the system of the seventh embodiment, wherein the computer processing unit is further configured to execute image processing operations prior to executing the hand recognition operations A tenth embodiment, which is the system of the seventh embodiment, wherein the hand recognition operations comprise the steps of storing one or more video images in the computer processing unit; performing image processing operations on the stored video images; performing hand recognition operations on the processed video images, thereby developing a computer model of the hand position, finger positions, and directions of finger and hand motions; and comparing the computer model of the hand position, finger positions, and directions of finger and hand motions with pre-determined hand commands.

An eleventh embodiment, which is the system of the tenth embodiment, wherein the image processing operations comprise gray-scale modification, brightness and contrast adjustment, and/or edge-enhancement functions.

An twelfth embodiment, which is the system of the tenth embodiment, wherein the hand recognition operations comprise the steps of analyzing the processed video images to determine the positions of various locations on each of the fingers of the user, and the overall position of the hand of the user; and comparing successive processed video images to determine the directions of motion of various locations on each of the fingers of the user, and the overall motions of the fingers and hand of the user.

A thirteenth embodiment, which is a non-volatile computer-readable storage medium storing one or more programs configured to be executed by computer processing unit, the programs when executing on the computer processing unit, performing a method for starting and controlling communications conducted through a video relay service without the need for a remote-control device, the method comprising configuring a VRS client, including a camera; a computer processing unit, connected to the non-volatile computer-readable storage medium; and an internet connection; loading video images of the user acquired with the camera into the computer processing unit; recognizing hand commands using the computer processing unit, wherein the computer processing unit executes computer commands to perform a hand recognition operation; and performing control functions of the video relay service based on the recognized hand commands.

A fourteenth embodiment, which is the non-volatile computer-readable storage medium of the thirteenth embodiment, wherein the method further comprises the hand recognition steps of storing one or more video images in the computer processing unit performing image processing operations on the stored video images; performing a hand recognition operation on the processed video images, thereby developing a computer model of the hand position, finger positions, and direction of finger and hand motion; and comparing the computer model of the hand position, finger positions, and direction of hand motion with pre-determined hand commands.

A fifteenth embodiment, which is the non-volatile computer-readable storage medium of the thirteenth embodiment, wherein the method further comprises the image processing operations of gray-scale modification, brightness and contrast adjustment, and/or edge-enhancement functions.

A sixteenth embodiment, which is the non-volatile computer-readable storage medium of the thirteenth embodiment, wherein the method further comprises the hand recognition operations steps of analyzing the processed video images to determine the positions of various locations on each of the fingers of the user, and the overall position of the hand of the user; and comparing successive processed video images to determine the directions of motion of various locations on each of the fingers of the user, and the overall motion of the hand of the user.

While the foregoing describes a preferred embodiment of the present invention, one skilled in the art will appreciate that various changes, substitutions and alterations can be made without departing from the scope of the invention. For example, a single device having a camera and codec (202 in FIG. 2) integrated with a command processing unit (CPU 206 in FIG. 2) in a single hardware module is within the scope of the present invention. Moreover, a VRS client running in CPU 206 implemented as software executing on a general-purpose computer meeting the hardware requirements for video telephony over IP networks is within the scope of the present invention. General-purpose computers include laptop computers, desktop computers, tablet computers, smartphones, etc. Portable devices such as smartphones and tablets combining cameras with IP data connectivity can help D-HOH-SI persons to communicate with hearing persons via a VRS service, taking advantage of the portability of these portable devices.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method for enabling a user to start and control communications conducted through a video relay service (VRS) without the need for a remote-control device, the method comprising:
configuring a video relay service client, including:
a camera;
a computer processing unit; and
an internet connection;
loading video images of the user acquired with the camera into the computer processing unit;
recognizing a first hand command using the computer processing unit, the first hand command comprising a gesture that is not a sign language gesture, wherein recognition of the first hand command causes the computer processing unit to enter a mode that recognizes sign language gestures;
subsequent to the computer processing unit entering a mode that recognizes sign language gestures, recognizing a second hand command using the computer processing unit, the second hand command comprising a gesture that is a sign language gesture; wherein the computer processing unit executes computer commands to perform a hand recognition operation; and
performing control functions of the video relay service client based on the recognized hand commands.

2. The method of claim 1, further comprising a non-volatile computer-readable storage medium connected to the computer processing unit, wherein hand recognition computer commands are stored in the non-volatile computer-readable storage medium.

3. The method of claim 1, further comprising repeating the steps of loading video images, recognizing hand commands, and performing control functions to perform multiple operations during VRS communications.

4. The method of claim 1, wherein the hand recognition operation comprises the steps of:
storing one or more video images in the computer processing unit;
performing image processing operations on the stored video images;
performing hand recognition operations on the processed video images, thereby developing a computer model of the hand position, finger positions, and directions of finger and hand motions; and
comparing the computer model of the hand position, finger positions, and directions of finger and hand motions with pre-determined hand commands.

5. The method of claim 4, wherein the image processing operations comprise gray-scale modification, brightness and contrast adjustment, and/or edge-enhancement functions.

6. The method of claim 4, wherein the hand recognition operations comprise the steps of:
analyzing the processed video images to determine the positions of various locations on each of the fingers of the user, and the overall position of the hand of the user; and comparing successive processed video images to determine the directions of motion of various locations on each of the fingers of the user, and the overall motion of the hand of the user.

7. A video relay service (VRS) system for enabling a user to start and control communications conducted through a video relay service without the need for a remote-control device, the system comprising:
a camera;
a computer processing unit, wherein the computer processing unit is configured to execute hand recognition operations; and
an internet connection;
wherein the computer processing unit is further configured for:
loading video images of the user acquired with the camera into the computer processing unit;
recognizing a first hand command using the computer processing unit, the first hand command comprising a gesture that is not a sign language gesture, wherein recognition of the first hand command causes the computer processing unit to enter a mode that recognizes sign language gestures;
subsequent to the computer processing unit entering a mode that recognizes sign language gestures, recognizing a second hand command using the computer processing unit, the second hand command comprising a gesture that is a sign language gesture;
wherein the computer processing unit executes computer commands to perform a hand recognition operation; and
performing control functions of the video relay service system based on the recognized hand commands.

8. The system of claim 7, further comprising a non-volatile computer-readable storage medium connected to the computer processing unit, wherein hand recognition computer commands are stored in the non-volatile computer-readable storage medium.

9. The system of claim 7, wherein the computer processing unit is further configured to execute image processing operations prior to executing the hand recognition operations.

10. The system of claim 7, wherein the hand recognition operations comprise the steps of:
storing one or more video images in the computer processing unit;
performing image processing operations on the stored video images;
performing hand recognition operations on the processed video images, thereby developing a computer model of the hand position, finger positions, and directions of finger and hand motions; and
comparing the computer model of the hand position, finger positions, and directions of finger and hand motions with pre-determined hand commands.

11. The system of claim 10, wherein the image processing operations comprise gray-scale modification, brightness and contrast adjustment, and/or edge-enhancement functions.

12. The system of claim 10, wherein the hand recognition operations comprise the steps of:
analyzing the processed video images to determine the positions of various locations on each of the fingers of the user, and the overall position of the hand of the user; and
comparing successive processed video images to determine the directions of motion of various locations on each of the fingers of the user, and the overall motions of the fingers and hand of the user.

13. A non-transitory computer-readable storage medium storing one or more programs configured to be executed by computer processing unit, the programs when executing on the computer processing unit, performing a method for starting and controlling communications conducted through a video relay service without the need for a remote-control device, the method comprising:
configuring a video relay service client, including:
a camera;
a computer processing unit, connected to the non-volatile computer-readable storage medium; and
an internet connection;
loading video images of the user acquired with the camera into the computer processing unit;
recognizing a first hand command using the computer processing unit, the first hand command comprising a gesture that is not a sign language gesture, wherein recognition of the first hand command causes the computer processing unit to enter a mode that recognizes sign language gestures;
subsequent to the computer processing unit entering a mode that recognizes sign language gestures, recognizing a second hand command using the computer processing unit, the second hand command comprising a gesture that is a sign language gesture; wherein the computer processing unit executes computer commands to perform a hand recognition operation; and
performing control functions of the video relay service client based on the recognized hand commands.

14. The non-transitory computer-readable storage medium of claim 13, wherein the method further comprises the hand recognition steps of:
storing one or more video images in the computer processing unit;
performing image processing operations on the stored video images;
performing a hand recognition operation on the processed video images, thereby developing a computer model of the hand position, finger positions, and direction of finger and hand motion; and
comparing the computer model of the hand position, finger positions, and direction of hand motion with pre-determined hand commands.

15. The non-transitory computer-readable storage medium of claim 13, wherein the method further comprises the image processing operations of gray-scale modification, brightness and contrast adjustment, and/or edge-enhancement functions.

16. The non-transitory computer-readable storage medium of claim 13, wherein the method further comprises the hand recognition operations steps of:
analyzing the processed video images to determine the positions of various locations on each of the fingers of the user, and the overall position of the hand of the user; and
comparing successive processed video images to determine the directions of motion of various locations on each of the fingers of the user, and the overall motion of the hand of the user.

* * * * *